(12) United States Patent
Qiu et al.

(10) Patent No.: US 10,222,264 B2
(45) Date of Patent: Mar. 5, 2019

(54) STANDARD LIGHT SOURCE COLOR MATCHING OBSERVATION BOX

(71) Applicant: WENZHOUJIAYI INSTRUMENTS Co. Ltd., Wenzhou, Zhejiang Province (CN)

(72) Inventors: Jiayi Qiu, Wenzhou (CN); Guihua Cui, Wenzhou (CN); Changjun Li, Wenzhou (CN); Yingsheng Zhan, Wenzhou (CN); Jian Lin, Wenzhou (CN); Daping Deng, Wenzhou (CN)

(73) Assignee: WENZHOUJIAYI INSTRUMENTS CO., LTD. (CN)

( * ) Notice: Subject to any disclaimer, the term of this patent is extended or adjusted under 35 U.S.C. 154(b) by 21 days.

(21) Appl. No.: 15/546,338

(22) PCT Filed: Apr. 15, 2016

(86) PCT No.: PCT/CN2016/079510
§ 371 (c)(1),
(2) Date: Jul. 26, 2017

(87) PCT Pub. No.: WO2017/147987
PCT Pub. Date: Sep. 8, 2017

(65) Prior Publication Data
US 2018/0120161 A1    May 3, 2018

(30) Foreign Application Priority Data
Mar. 4, 2016 (CN) .......................... 2016 1 0123958

(51) Int. Cl.
*G01J 3/46* (2006.01)
*G01J 3/10* (2006.01)

(52) U.S. Cl.
CPC .. *G01J 3/46* (2013.01); *G01J 3/10* (2013.01)

(58) Field of Classification Search
CPC ...................................... G01J 3/46; G01J 3/10
See application file for complete search history.

(56) References Cited

PUBLICATIONS

Borbely et al. "Color Matching Using LEDs as Primaries", Color research and application (Year: 2004).*

* cited by examiner

*Primary Examiner* — Hina F Ayub
(74) *Attorney, Agent, or Firm* — PROI Intellectual Property US (57) ABSTRACT

A standard light source color matching observation box comprises a box body, the interior space of which forms an observation chamber. The top of the observation chamber is provided with a standard light source comprising a halogen tungsten lamp under which a light filter is provided. The top of the observation chamber is further provided with an LED light. The halogen tungsten lamp emits a light ray through the light filter to be mixed with the light ray of the LED light. The illumination energy provided by a narrow-wave LED light source occupies 20% or less of the total radiation energy. The quality of the compensated light source of the invention is lower than <0.2 A level according to the metamerism index specified by D illuminant of the CIE standard. An object to be measured undergoes a color measurement by the compensated light ray to ensure accuracy of long-time color measurement.

11 Claims, 6 Drawing Sheets

STANDARD LIGHT SOURCE COLOR MATCHING OBSERVATION BOX

CROSS REFERENCE TO RELATED APPLICATIONS

The present application is the US national stage of International Patent Application PCT/CN2016/079510 filed on Apr. 15, 2016, which, in turn, claims priority to Chinese Patent Application CN 201610123958.9 filed on Mar. 4, 2016.

TECHNICAL FIELD

The present invention relates to a detection structure, and more particularly to a standard light source color matching observation box.

BACKGROUND ART

The light source of the daylight of a standard D illuminant for a standard light source color matching observation box or light box in the current market includes a variety of brands of fluorescent tubes and uses a halogen tungsten lamp to pass through the light filter so that the radiated light ray simulates a D illuminant specified by the CIE standard. The relative spectral power distribution of the radiated light source passing through the light filter with the halogen tungsten lamp can reach A level of the metamerism index of the D illuminant specified by the CIE standard. However, due to the influence of the material and the manufacturing process technology, it is difficult for the technical indicator of the relative spectral power distribution of its function for irradiating the light source to achieve the A-level metamerism index quality level <0.2 of the CIE D-standard illuminant. In the course of the using for a long time, it will gradually deteriorate, and even exceed the metamerism index of 0.25, with only B level of >0.25~0.50 level. As the halogen tungsten lamps of the same specification have a difference in material composition, and the relative spectral power distribution of the light emitted therefrom cannot have a relatively consistent quality. The configured light filter of colored optical glass will vary with the relative spectral power distribution of the permeable radiated light because of material. The combination of a light filter and a halogen tungsten lamp can only form a CIE standard D illuminant of a single specification. The CIE standard illuminant includes D65, D75, D55, D50 and other standards. The prior art makes it difficult to ensure that the standard light source continues to have a stable spectral power distribution after prolonged use, and the replacement of the halogen tungsten lamp or the light filter will produce a difference, thus affecting the accuracy of the test.

It is difficult for the spectral power distribution of the light ray of the halogen tungsten lamp through the light filter to solve the zigzag shape of different wavelengths, so the light source quality of SpectraLightQC standard light source color matching observation box (new products put into market only in 2013) which is considered to have the highest quality in the current market can only reach A or B level of 0.20-0.30 according to the metamerism index of the light source of the quality indicator specified by CIE15: 2004. The halogen tungsten lamp tube used by such standard D daylight source causes the relative spectral power distribution of the light source to vary since the used tungsten wire and the inert gas containing halide and halogen elements has a gradual change in efficiency in the process of using the lamp tube for a long time and the material (chemical material) of the colored optical glass for the light filter varies. Therefore, in the course of use, the metamerism index of the light source gradually increases from 0.21 to 0.25-0.30, and can only be maintained at the B level. Although the illumination is still high, the luminous area formed by winding tungsten wires in the lamp tube has a difference in distances of different lengths, and the illumination energy emitted therefrom will be different, so the illumination uniformity for the position storing objects in the light source box can only reach about 90% of the quality level.

In recent years, due to LED light source has the advantages such as saving power, high luminous efficiency and long life, etc., a number of light source research units have introduced the use of an LED to simulate the CIE standard D light source. Since the spectral distribution of the light ray emitted by the LED can only be in the narrow wavelength band, and the main peak of the spectrum emitted by each LED is narrowed into spikes, although the light rays of three narrow waves of red, green and blue can form an integrity to emit white light, its spectral power distribution has defects. So a multi-stage narrow-band LED is used to combine to emit light to illuminate the spectral power distribution close to the specification requirements of the D illuminant specified by the CIE standard, but the relative spectral power distribution of the light ray that it illuminates the position in which objects are stored in the standard light source color matching observation box is non-uniform. Recently an LED-based intelligent color matching light box is introduced, using the method of using at least with an LED white light source and a plurality of single-color LEDs as the illuminant. A halogen tungsten lamp is used to configure a special light filter to emit light to supplement the radiant energy of the overall visible light. The use of electronic technology to monitor the intelligent adjustment of the energy of the light ray emitted by each LED light. Although the combination of light ray emitted therefrom can simulate the color temperature index of the CIE standard D illuminant, the main peak energy of the spectrum of the light ray emitted by a variety of LEDs, and the relative spectral power distribution parameters of the light ray emitted therefrom cannot reach the index of each band specified by the CIE standard. It is clear that the difference is very obvious only if the measured data for analyzing the relative spectral power distribution of the emitted light ray and the relative spectral power distribution parameter of the D illuminator specified by the CIE standard are compared. Although the current general color temperature measuring instrument is used to measure its color temperature value so as to achieve the D light source indicators specified by the CIE standard, it is very difficult for the metamerism index of the light source emitted therefrom to reach A level. This uses a plurality of single-color LEDs to configure a white light LED as the main body of the light source radiation energy, but the light ray transmitted in such a way that a tungsten lamp configures a light filter is used as a supplement of the radiation energy. It is still very difficult for the radiation uniformity to have a good uniformity on the surface of the sample to be measured.

The commonly used technical means for measuring the color of a standard light source color matching observation box or light box in the current market is naked-eye visual observation or measurement of a color measuring instrument. The naked-eye visual observation is to place standard samples and batch samples in the standard light source color matching observation box to compare the difference therebetween by the naked eyes of those skilled in the art, and make a judgment about whether to meet the requirements. The color measuring instrument is to calculate the color difference therebetween by obtaining their own color parameters of the standard samples and the batch samples using the instrument, respectively, and make a judgment about whether to meet the requirements. The naked-eye visual observation is completed by those skilled in the art in the standard light source color matching observation box complying with the international CIE standard, but the visual observation method is susceptible to the direct impact that the accuracy of the spectral relative power distribution of the used standard light sources has on the color that the surface of the object shows. In addition, due to the observer's emotional, physical and psychological factors, its subjectivity is very strong and the repeatability is very poor. Different observers provide very different evaluation results in different standard light source color matching observation boxes. Even the same observer also provides very observation evaluation results in different periods. Therefore, on the production, sales, consumption supply chains of the measured objects, because the difference of the visual evaluation will have a lot of disputes, although the measuring method of the color measuring instrument can reduce the impact of human factors as much as possible and give a reliable, objective and repeatable measurement and identification results, the traditional color measuring instrument cannot measure the color of color images, curved surfaces, or rugged, color mixing, coloring uneven or irregular object surfaces due to the restrictions of the principle and the structure of the instrument itself.

SUMMARY

It is an object of the present invention to overcome the shortcomings of the prior art and to provide a standard light source color matching observation box which is simple in structure, achieves a stable simulation of D illuminants, and ensures test accuracy.

The invention adopts the following technical solution: a standard light source color matching observation box, comprising a box body, wherein the box body has an opening at one side and forms an observation chamber in the interior space, the top of the observation chamber is provided with a standard light source, wherein the standard light source comprises a halogen tungsten lamp, a light filter is provided in the lower part of the halogen tungsten lamp, the top of the observation chamber is further provided with a narrow-wave LED light source, the halogen tungsten lamp emits a light ray through the light filter to be mixed with the light ray of the LED light, and the illumination energy provided by the narrow-wave LED light source occupies 20% or less of the total radiation energy.

As an improvement, the narrow-wave LED light source is provided in a group, the group has a plurality of narrow-wave LED light sources of different wavelengths, and when the brightness of the plurality of narrow-wave LED light sources of different wavelengths is adjusted, the light ray emitted by the halogen tungsten lamp through the light filter is compensated for.

As an improvement, the standard light source further comprises a UV ultraviolet lamp which compensates for UV energy when working together with the halogen tungsten lamp and the narrow-wave LED light source.

As an improvement, the halogen tungsten lamp and the light filter are provided in two groups, which are symmetrically provided at the left and right at the top of the observation chamber; the narrow-wave LED light sources are provided in corresponding two groups, which are provided outside the light filter, respectively; and the UV ultraviolet lights are provided in corresponding two groups, which are provided on the front and rear sides of the light filter, respectively.

As an improvement, a diffusion-scattering uniform light lampshade is provided outside the narrow-wave LED light sources provided in groups.

As an improvement, a diffusion-scattering uniform light glass plate is provided between the observation chamber and the standard light source; a mirror-reflecting reflector face is provided at the top of the observation chamber, and the light ray emitted from the standard light source is reflected by the reflector surface.

As an improvement, the halogen tungsten lamp is a uniform scattering halogen tungsten lamp, the tube surface of the halogen tungsten lamp has a sandblasting layer, a mirror-reflecting aluminum plate covers above the halogen tungsten lamp, and the mirror-reflecting aluminum plate covers the periphery of the halogen tungsten lamp.

As an improvement, a digital camera is further provided at the top of the observation chamber, a storage substrate directly facing the digital camera is provided at the bottom of the observation chamber; when the digital camera is provided in the middle of the top of the observation chamber, the lens of the digital camera is just directed downwardly, and the storage substrate is a bottom plate of the box body or a plate body provided parallel to the bottom plate of the box body; and when the digital camera is provided in the middle, close to an opening of the box body, of the top of the observation chamber, the lens of the digital camera is directed at 45 degrees with the bottom plate of the box body, and the storage substrate is provided at 45 degrees with the bottom plate of the box body and directly faces the digital camera.

As an improvement, a curtain which is capable of being opened and closed is provided at the opening of the box body, and the inner layer of the curtain, the inner wall of the box body, and the substrate use the background with the same or similar neutral color.

As an improvement, the standard light source further comprises an incandescent lamp, a sunset lamp and a fluorescent lamp; the incandescent lamp is provided in two groups, which are provided on the inside of the light filter, respectively; the sunset lamp is provided in four groups, the front and rear sides of each group of light filters are symmetrically provided with one group, respectively; and a half-surrounded sunset shade is provided at one side, close to the middle of the observation chamber, of the sunset lamp; and the fluorescent lamp is provided in two groups, which are symmetrically provided on the front and rear sides of the light filter.

The present invention has the advantages that the light ray transmitted through the halogen tungsten lamp emits the radiation light ray before being compensated through the light filter; the narrow-wave LED light source is provided to emit the compensated light; the radiation light ray before being compensated and the compensation light are mixed in the color matching observation box to become the radiation light ray after being compensated; the radiation light ray after being compensated performs color measurement to the measured objects in the color matching observation box. The light ray emitted by the halogen tungsten lamp is used as the main body radiation light ray, which may have a more gentle spectral power distribution curve. The lack of energy of the halogen tungsten lamp through the light filter is compensated for by the low-power narrow-wave LED light source, which can be simulated into high-precision D illuminator of the CIE standard. The combination of a halogen tungsten lamp configured filter and a narrow-wave LED light source can simulate D illuminators of different specifications, D65, D75, D55, D50. It can be achieved by adjusting the brightness of the narrow-wave LED light source. The quality of the compensated light source is <0.2 A level according to the metamerism index specified by D illuminant of the CIE standard, which is difficult to achieve with the original light source; and it improves the stability of the light source, so that in the process of using the light source, it will not have changes in radiation light ray color temperature. The compensation light ray is adjusted by the automatic monitoring so that the radiation light ray color temperature is compliant with the standard, to ensure the accuracy of the result of a long-time color measurement.

In the diagrams: 1: box body; 11: observation chamber; 12: light filter; 13: diffusion-scattering uniform light glass plate; 14: mirror-reflecting reflector face; 2: standard light source; 21: halogen tungsten lamp; 211: mirror-reflecting aluminum plate; 22: narrow-wave LED light source; 221: diffusion-scattering uniform light lampshade; 23: incandescent lamp; 24: sunset lamp; 241: half-surrounded sunset shade; 25: fluorescent lamp; 26: UV ultraviolet light; 3: digital camera; 4: storage substrate; and 5: curtain.

DETAILED DESCRIPTION

Hereinafter, specific embodiments of the present invention will be described in detail with reference to the accompanying drawings.

Figure 1:
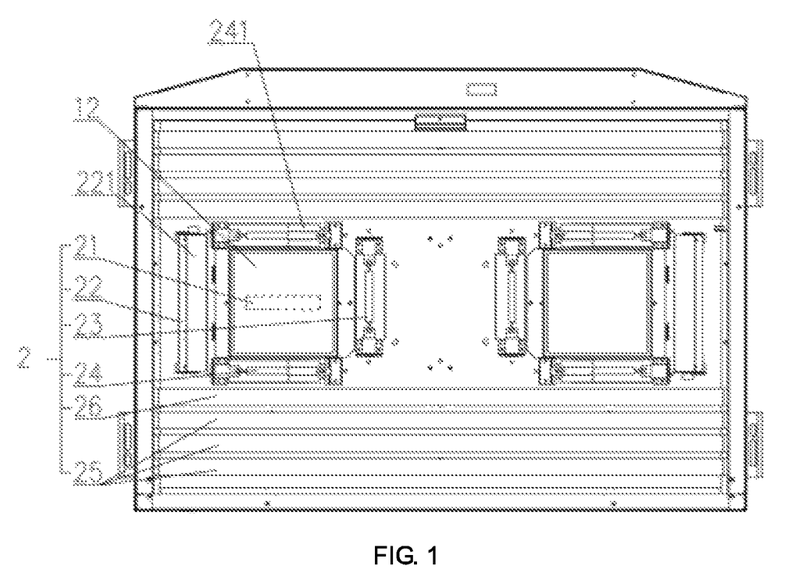
FIG. 1 is a bottom view of the bottom of a color matching observation box according to the present invention.
Figure 2:
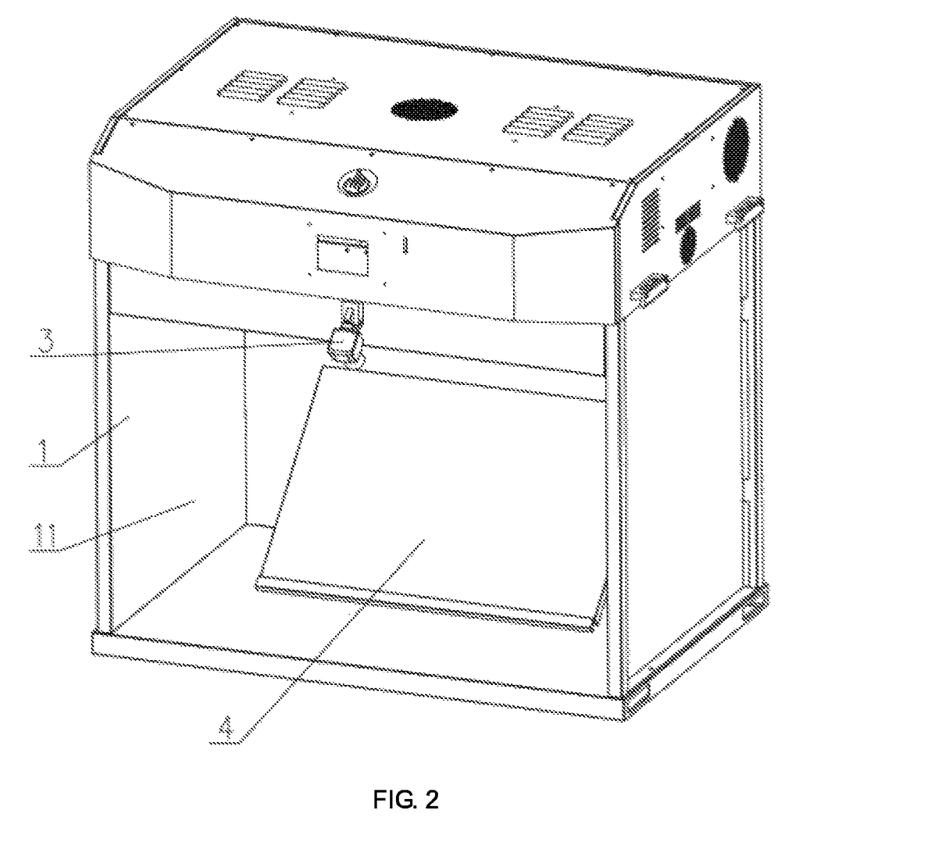
FIG. 2 is a stereoscopic structure view of a color matching observation box according to the present invention.
Figure 3:
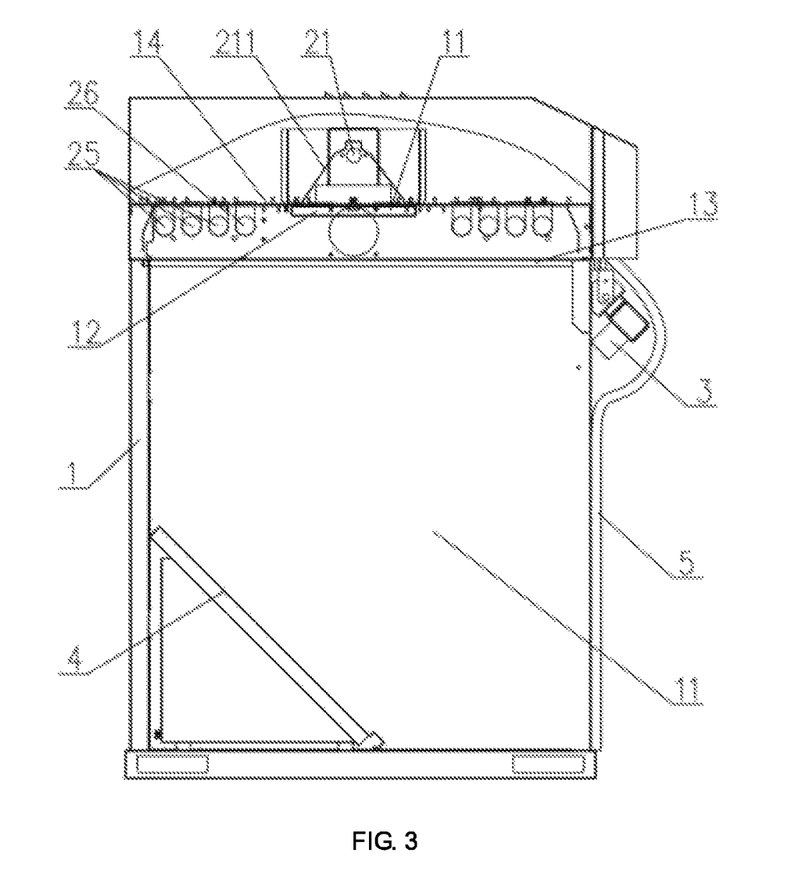
FIG. 3 is a first side partial cross-sectional view of a color matching observation box according to the present invention.
Figure 4:
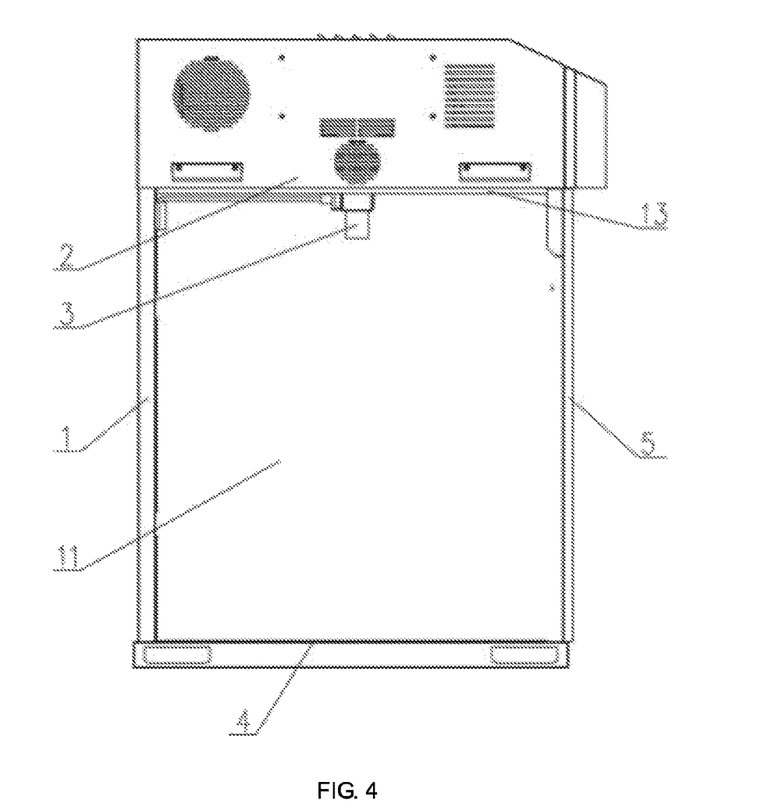
FIG. 4 is a second side partial cross-sectional view of a color matching observation box according to the present invention.
Figure 5:
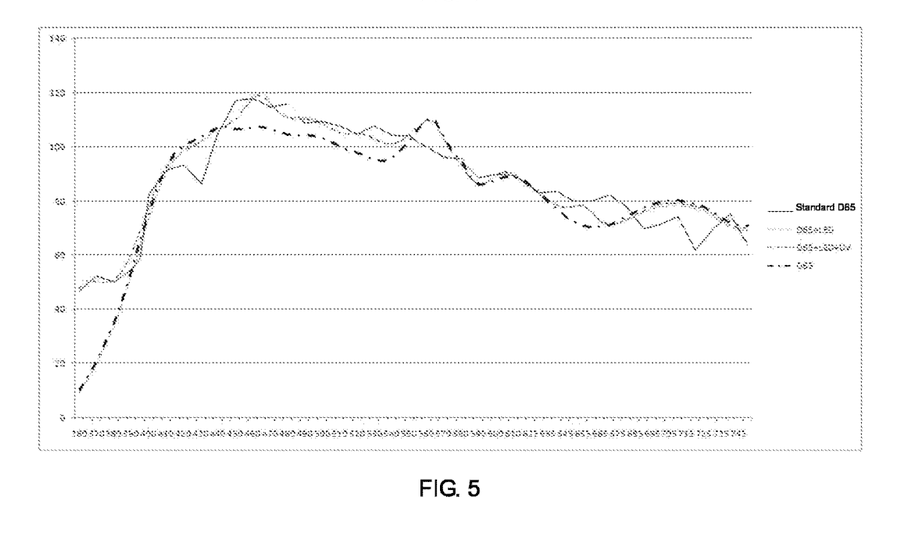
FIG. 5 is a comparison view of the spectral power distribution curve standards D65, D65, D65+LED, D65+LED+UV according to the present invention.
Figure 6:
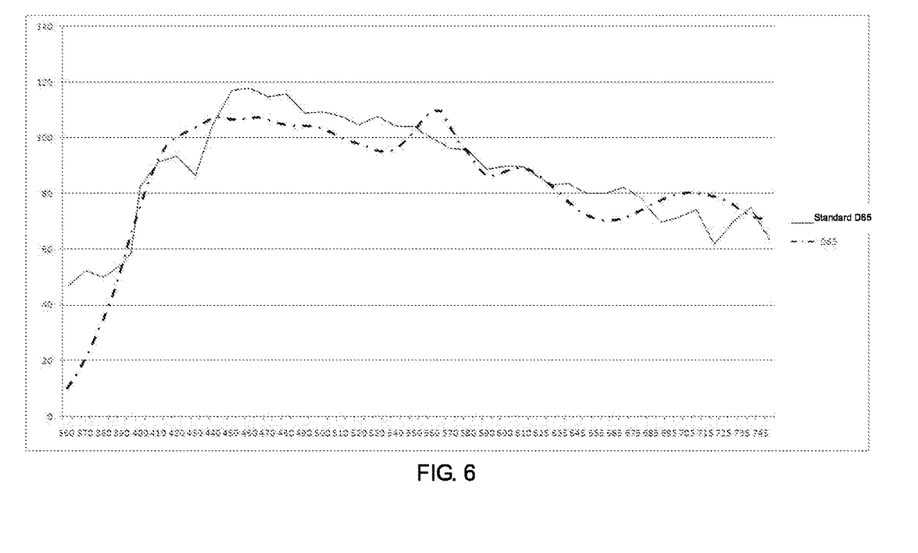
FIG. 6 is a comparison view of the spectral power distribution curve standards D65 and D65 according to the present invention.
Figure 7:
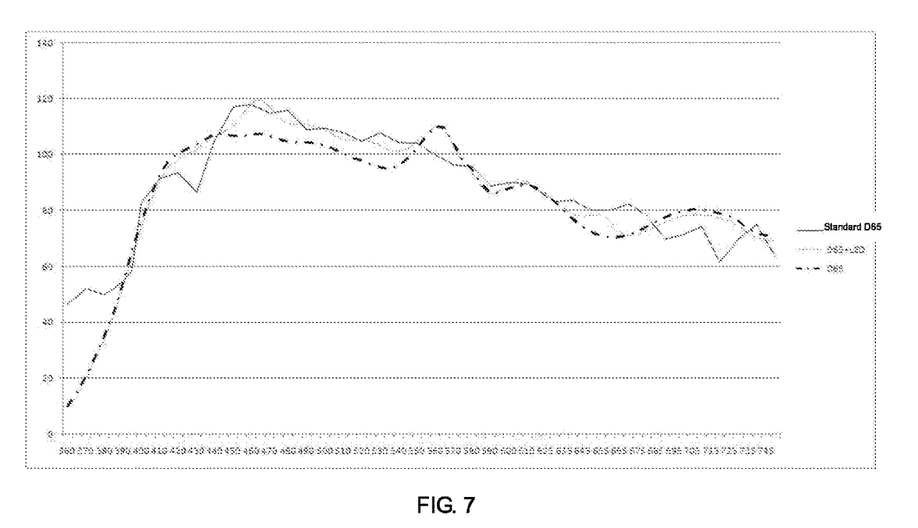
FIG. 7 is a comparison view of the spectral power distribution curve standards D65, D65, D65+LED according to the present invention.
Figure 8:
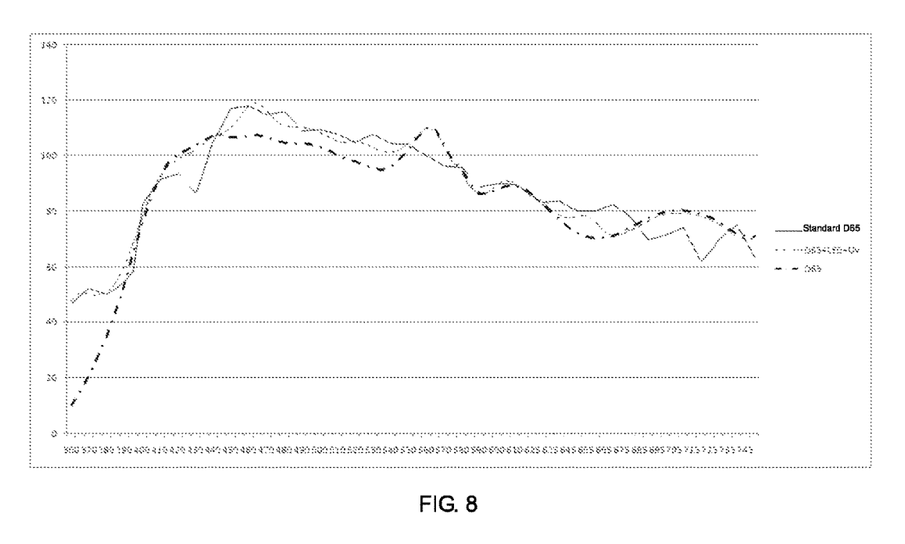
FIG. 8 is a comparison view of the spectral power distribution curve standards D65, D65, D65+LED+UV according to the present invention.

As shown in FIGS. 1, 2, 3, 4, 5, 6, 7, and 8, a specific embodiment of the standard light source color matching observation box of the present invention is shown. This embodiment comprises a box body 1, wherein the box body 1 has an opening at one side and forms an observation chamber 11 in the interior space, the top of the observation chamber 11 is provided with a standard light source 2, wherein the standard light source 2 comprises a halogen tungsten lamp 21, a light filter 12 is provided in the lower part of the halogen tungsten lamp 21, the top of the observation chamber 11 is further provided with a narrow-wave LED light source 22, the narrow band of the narrow-wave LED light source 22 is in the range of 350 nm to 850 nm, the halogen tungsten lamp 21 emits a light ray through the light filter 12 to be mixed with the light ray of the narrow-wave LED light 22, and the illumination energy provided by the narrow-wave LED light source 22 occupies 20% or less of the total radiation energy. The daylight source is an important light source for measuring the color, but the manner in which the existing halogen tungsten lamp 21 plus the light filter 12 simulates the daylight source will still produce a change in the relative spectral power distribution of the light source after a period of use, resulting in the fact that color measuring error occurs and is increasing; and a halogen tungsten lamp 21 can only simulate a standard D illuminator, and the spectral power distribution between the halogen tungsten lamps 21 is not the same, and the replacement will result in an error. An adjustable narrow-wave LED light source 22 is provided to be matched with the halogen tungsten lamp 21 so that the light ray of them can be mixed and compensated for as a D illuminant light source compliant with the standard for measuring; the brightness of the narrow-wave LED light source 22 is adjusted to simulate D illuminators of different specifications D65, D55, D50, etc.; after used for a period of time, if it is found that the mixed light source does not meet the standard after measuring, it can be compensated by debugging the narrow-wave LED light source 22, so that the relative spectral power distribution of the compensated mixed light source re-conforms to the CIE standard, and the halogen tungsten lamp 21 has a uniform emergent ray energy to improve the accuracy of color measurement of the standard light source color matching observation box to the measured object. As shown in FIGS. 5, 6 and 7, the simulated D65 light emitted from the halogen tungsten lamp 21 through the light filter 12 is used as the main body radiation light ray, which may have a more gentle spectral power distribution curve. The lack of energy of the halogen tungsten lamp 21 through the light filter 12 is compensated for by the low-power narrow-wave LED light source 22. The illumination energy of the narrow-wave LED light source 22 may only occupy 20% or less of the total radiation energy, which can be simulated into high-precision D65 of the CIE standard. The metamerism index of its light source can reach A level in the range of 0.10-0.18, and its color rendering index can be more than 97.5 quality indicators. The above embodiment has a better effect of simulating the standard D illuminator compared with the use of other light sources alone as a combination of the radiating body or other light source, thereby making the data of the color measurement more accurate.

As an improved specific embodiment, the narrow-wave LED light source 22 is provided in a group, the group has a plurality of narrow-wave LED light sources 22 of different wavelengths, and when the brightness of the plurality of narrow-wave LED light sources 22 of different wavelengths is adjusted, the light ray emitted by the halogen tungsten lamp 21 through the light filter 12 is compensated for. By providing a plurality of narrow-wave LED light sources 22 of different wavelengths, more flexible debugging of light source is realized, the debugged compensated light source is closer to the spectral power distribution of the standard D illuminator, and the measurement accuracy is improved; the flexible simulation of D illuminants of different standards is realized, and the measuring function of original multiple instruments is completed by an instrument.

As an improved specific embodiment, the standard light source 2 further comprises a UV ultraviolet lamp 26 which compensates for UV energy when working together with the halogen tungsten lamp 21 and the narrow-wave LED light source 22. As shown in FIGS. 5, 6, 7 and 8, for the light ray of the halogen tungsten lamp 21 after passing through the light filter 12, its 360-090 nm near-ultraviolet spectrum energy can only reach about 20% of the energy specified by the CIE standard D illuminator. The UV ultraviolet lamp 26 of the main wavelength of 365 nm is configured in the standard light source 2, and the energy of the UV ultraviolet lamp 26 can be controlled to supplement the UV energy of the light source of the halogen tungsten lamp 21. When being turned on with the halogen tungsten lamp 21 and the narrow-wave LED light source 22 at the same time to work, the UV ultraviolet lamp 26 can simulate the relative spectral power distribution curve of the more standard D illuminant, so that the measurement result is more accurate.

As an improved specific embodiment, the halogen tungsten lamp 21 and the filter 12 are provided in two groups, which are symmetrically provided at the left and right at the top of the observation chamber 11; the narrow-wave LED light sources 22 are provided in corresponding two groups, which are provided outside the light filter 12, respectively; and the UV ultraviolet lights 26 are provided in corresponding two groups, which are provided on the front and rear sides of the light filter 12, respectively. In order to further improve the accuracy of the color measurement, the halogen tungsten lamp 21 and the narrow-wave LED light source 22 are designed so that two groups are provided on the left and right sides, respectively, and the UV ultraviolet lamp 26 is positioned at the front and rear sides. The light ray in the whole observation chamber 11 is more uniform so that the overall illumination of the objects placed in the observation chamber 11 is uniformly illuminated after the light source is illuminated from the above. The color measurement is to test a plurality of points on the measured objects, and there are slight differences in illumination if its position is different. The above manner will make the measurement results more accurate; avoiding the disadvantage that the middle of the light ray is strong and both sides are weak in the traditional method of providing the light source, and preventing the color data of the measured objects from having larger errors between the middle and both sides.

As an improved specific embodiment, a diffusion-scattering uniform light lampshade 221 is provided outside the narrow-wave LED light sources 22 provided in groups. The light ray of a plurality of narrow-wave LED light sources 22 of different wavelengths can be sufficiently mixed into the diffusion-scattering light ray in the diffusion-scattering uniform light lampshade 221, and after being emitted from the lampshade, it can be better mixed with the light ray diffusion-scattered by the halogen tungsten lamp 21 through the light filter 12 for compensating, avoiding the non-uniformity of the light ray in the observation chamber 11 of the box body, improving the overall measurement accuracy.

As an improved specific embodiment, a diffusion-scattering uniform light glass plate 13 is provided between the observation chamber 11 and the standard light source 2; a mirror-reflecting reflector face 14 is provided at the top of the observation chamber 11, and the light ray emitted from the standard light source 2 is reflected by the reflector surface 14. The overall standard light source 2 is provided behind the diffusion-scattering uniform light glass plate 13. After passing through the diffusion-scattering uniform light glass plate 13, the light ray can be more uniformly illuminated to the observation chamber 11 of the box body, so that the light ray is further uniformly projected onto the measured objects so as to improve the accuracy of the measurement. In order to make full use of the energy emitted by the light source, the reflector surface 14 is provided. A portion of the light ray reaches the reflector surface 14 after being reflected by the diffusion-scattering uniform light glass plate 13. The reflector surface 14 reflects the light ray again so that the light ray energy can be sufficiently utilized and sufficiently mixed with other light rays in the space so as to achieve the uniform effect of mixing light.

As an improved specific embodiment, the halogen tungsten lamp 21 is a uniform scattering halogen tungsten lamp, the tube surface of the halogen tungsten lamp 21 has a sandblasting layer, a mirror-reflecting aluminum plate 211 covers above the halogen tungsten lamp 21, and the mirror-reflecting aluminum plate 211 covers the periphery of the halogen tungsten lamp 21. Tungsten wires have a certain length, the distance in which it is wound and shaped will have more or less difference, so the light emitted by the whole halogen tungsten lamp 21 in the position of different lengths will also have difference in strength; after a sandblasting layer is provided on the surface of the tube, the tube is made into a diffusion-scattered glass structure. The light ray will be reflected in the light emitting segment in the tube of the halogen tungsten lamp 21, and the light emitted finally has a better uniformity. The mirror-reflecting aluminum plate 211 is provided so that the light ray emitted from the halogen tungsten lamp 21 is sufficiently reflected and mixed in the space above the light filter 12 to make the energy of the radiated light ray more uniform.

As an improved specific embodiment, a digital camera 3 is further provided at the top of the observation chamber 11, a storage substrate 4 directly facing the digital camera 3 is provided at the bottom of the observation chamber 11; when the digital camera 3 is provided in the middle of the top of the observation chamber 11, the lens of the digital camera 3 is just directed downwardly, and the storage substrate 4 is a bottom plate of the box body 1 or a plate body provided parallel to the bottom plate of the box body 1; and when the digital camera 3 is provided in the middle, close to an opening of the box body 1, of the top of the observation chamber 11, the lens of the digital camera 3 is directed at 45 degrees with the bottom plate of the box body 1, and the storage substrate 4 is provided at 45 degrees with the bottom plate of the box body 1 and directly faces the digital camera 3. In the measurement, the measured object is placed on the storage substrate 4 and is uniformly radiated from above by the standard light source 2. The image color data of the measured object is obtained by the above digital camera 3 directly facing the storage substrate 4. The color difference between the standard samples and the batch samples of the measured object is directly compared by the calculation of a computer, which excludes the human impact factors of the naked-eye observation, and the accuracy of the measurement result is higher and more reliable than that of the naked-eye observation. The method of obtaining the image color data by the digital camera 3 can measure the color of color images, curved surfaces, or rugged, color mixing, coloring uneven or irregular object surfaces which cannot be detected by the conventional color measuring instrument, and the using range is wider. The box body 1 has an opening at one side so as to facilitate the fetching of the standard samples and batch samples of the measured object and the standard color card; the digital camera 3 can perform automatic measurement or a tester can perform a naked-eye measurement through the opening as required to meet different measuring needs. The digital camera 3 may be provided in a plurality of positions. When the intermediate position of the top of the observation chamber 11 has a suitable arranging space, the standard light source 2 is symmetrically provided on the periphery of the digital camera 3 so that the illumination in the observation chamber 11 is uniform, reducing the impact of the light source on the color measurement of the measured object itself. The digital camera 3 directly collects the image color data of the measured object directly placed below, with small errors and small external interference. It is possible to directly use the substrate of the box body 1 as the storage substrate 4 or provide an additional plate body to store the measured objects as required, so as to improve the measuring flexibility of the observation chamber 11 and match the different measured objects. Another arranging method is to set the digital camera 3 at the opening to simulate the observing direction of the traditional human eye. The angles of the standard light source 2 and the measured object are set to 45 degrees in accordance with the standard lighting observation conditions specified by the CIE in the structure, and the directly facing relationship between the digital camera 3 and the measured object is ensured so that the measured data meets the standard specified by the CIE. The storage substrate 4 which is provided in a tilting manner allows the tester to observe the measured object, to better perform a naked-eye measurement, and to provide a better structure to select the measurement method as required. The image color data of the measured object is obtained by the digital camera. The color difference between the standard samples and the batch samples of the measured object is directly compared by the calculation of a computer, which excludes the human impact factors of the naked-eye observation, and the accuracy of the measurement result is higher and more reliable than that of the naked-eye observation. The method of obtaining the image color data by the digital camera 3 can measure the color of color images, curved surfaces, or rugged, color mixing, coloring uneven or irregular object surfaces which cannot be detected by the conventional color measuring instrument, and the using range is wider.

As an improved specific embodiment, a curtain 5 which is capable of being opened and closed is provided at the opening of the box body 1, and the inner layer of the curtain 5, the inner wall of the box body 1, and the substrate 4 use the background with the same or similar neutral color. To further improve the accuracy of the color measurement, a curtain 5 which is capable of being opened and closed is provided. When the digital camera 3 performs a color measurement, the curtain 5 is pulled down so that the observation chamber 11 forms a closed opaque space, thereby reducing the interference and impact of the external light ray on the color measurement, so that the measurement results are more accurate. The curtains 5 can be rolled up when they are not used or a naked-eye observation is required and can be used as a traditional instrument, and it is easy to replace the measured objects. The measuring environment is set as a uniform neutral background, reducing the impact of the instrument on the measurement and improving the accuracy of the measurement.

As an improved specific embodiment, the standard light source 2 further comprises an incandescent lamp 23, a sunset lamp 24 and a fluorescent lamp 25; the incandescent lamp 23 is provided in two groups, which are provided on the inside of the light filter 12, respectively; the sunset lamp 24 is provided in four groups, the front and rear sides of each group of light filters 12 are symmetrically provided with one group, respectively; and a half-surrounded sunset shade 241 is provided at one side, close to the middle of the observation chamber 11, of the sunset lamp 24; and the fluorescent lamp 25 is provided in two groups, which are symmetrically provided on the front and rear sides of the light filter 12. The standard light source color matching observation box of the present invention satisfies the measuring requirements of different objects by arranging other standard light sources. Each light source is symmetrically provided in a reasonable manner, so that the entire observation chamber 11 has uniform illumination, improving the accuracy of the measurement. Each light source uses a different position to be provided in a more reasonable manner according to different natures. A half-surrounded sunset shade 241 is provided so as to prevent the illumination of the sunset lamp 24 close to the middle of the box body from being too strong, ensuring that the illumination uniformity of the sunset lamp 24. At the same time, the UV ultraviolet lamp 26 can be used in conjunction with other light sources to measure some objects of special colors. The fluorescent lamp 25 may provide one or more of U30, TL84, CWF to improve the measuring range of the color matching observation box, or to provide other models of fluorescent lamps according to the measuring requirements of different countries.

What is claimed is:

1. A standard light source color matching observation box, comprising a box body, wherein the box body has an opening at one side and forms an observation chamber in the interior space, the top of the observation chamber is provided with a standard light source, wherein the standard light source comprises a halogen tungsten lamp, a light filter is provided in the lower part of the halogen tungsten lamp, the top of the observation chamber is further provided with a narrow-wave LED light source, the halogen tungsten lamp emits a light ray through the light filter to be mixed with the light ray of the LED light, and the illumination energy provided by the narrow-wave LED light source occupies 20% or less of the total radiation energy.

2. The standard light source color matching observation box according to claim 1, wherein the narrow-wave LED light source is provided in a group, the group has a plurality of narrow-wave LED light sources of different wavelengths, and when the brightness of the plurality of narrow-wave LED light sources of different wavelengths is adjusted, the light ray emitted by the halogen tungsten lamp through the light filter is compensated for.

3. The standard light source color matching observation box according to claim 2, wherein the standard light source further comprises a UV ultraviolet lamp which compensates for UV energy when working together with the halogen tungsten lamp and the narrow-wave LED light source.

4. The standard light source color matching observation box according to claim 3, wherein the halogen tungsten lamp and the light filter are provided in two groups, which are symmetrically provided at the left and right at the top of the observation chamber; the narrow-wave LED light sources are provided in corresponding two groups, which are provided outside the light filter, respectively; and the UV ultraviolet lights are provided in corresponding two groups, which are provided on the front and rear sides of the light filter, respectively.

5. The standard light source color matching observation box according to claim 4, wherein a diffusion-scattering uniform light lampshade is provided outside the narrow-wave LED light sources provided in groups.

6. The standard light source color matching observation box according to claim 5, wherein the standard light source further comprises an incandescent lamp, a sunset lamp and a fluorescent lamp; the incandescent lamp is provided in two groups, which are provided on the inside of the light filter, respectively; the sunset lamp is provided in four groups, the front and rear sides of each group of light filters are symmetrically provided with one group, respectively; and a half-surrounded sunset shade is provided at one side, close to the middle of the observation chamber, of the sunset lamp; and the fluorescent lamp is provided in two groups, which are symmetrically provided on the front and rear sides of the light filter.

7. The standard light source color matching observation box according to claim 4, wherein the standard light source further comprises an incandescent lamp, a sunset lamp and a fluorescent lamp; the incandescent lamp is provided in two groups, which are provided on the inside of the light filter, respectively; the sunset lamp is provided in four groups, the front and rear sides of each group of light filters are symmetrically provided with one group, respectively; and a half-surrounded sunset shade is provided at one side, close to the middle of the observation chamber, of the sunset lamp; and the fluorescent lamp is provided in two groups, which are symmetrically provided on the front and rear sides of the light filter.

8. The standard light source pair color matching observation box according to claim 1, wherein a diffusion-scattering uniform light glass plate is provided between the observation chamber and the standard light source; a mirror-reflecting reflector face is provided at the top of the observation chamber, and the light ray emitted from the standard light source is reflected by the reflector surface.

9. The standard light source color matching observation box according to claim 1, wherein the halogen tungsten lamp is a uniform scattering halogen tungsten lamp, the tube surface of the halogen tungsten lamp has a sandblasting layer, a mirror-reflecting aluminum plate covers above the halogen tungsten lamp, and the mirror-reflecting aluminum plate covers the periphery of the halogen tungsten lamp.

10. The standard light source color matching observation box according to claim 1, wherein a digital camera is further provided at the top of the observation chamber, a storage substrate directly facing the digital camera is provided at the bottom of the observation chamber; when the digital camera is provided in the middle of the top of the observation chamber, the lens of the digital camera is just directed downwardly, and the storage substrate is a bottom plate of the box body or a plate body provided parallel to the bottom plate of the box body; and when the digital camera is provided in the middle, close to an opening of the box body, of the top of the observation chamber, the lens of the digital camera is directed at 45 degrees with the bottom plate of the box body, and the storage substrate is provided at 45 degrees with the bottom plate of the box body and directly faces the digital camera.

11. The standard light source color matching observation box according to claim 10, wherein a curtain which is capable of being opened and closed is provided at the opening of the box body, and the inner layer of the curtain, the inner wall of the box body, and the substrate use the background with the same or similar neutral color.

* * * * *